July 31, 1956
J. R. BOUNDY
2,757,326
SERVO ELECTRICAL CONTROLLING APPARATUS
Filed Aug. 10, 1953
2 Sheets-Sheet 2
FIG. IA.
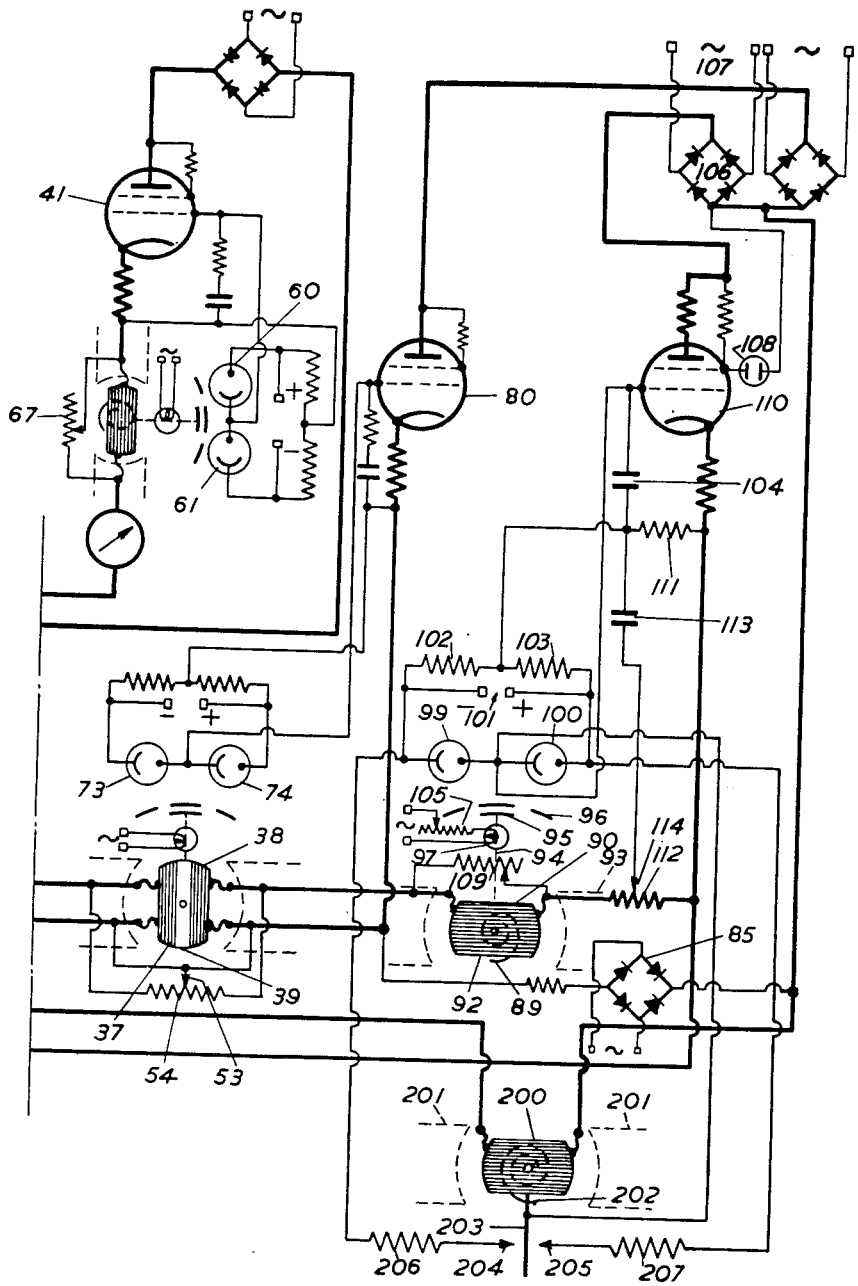
Inventor
James R. Boundy
By Ralph B. Stewart
Attorney

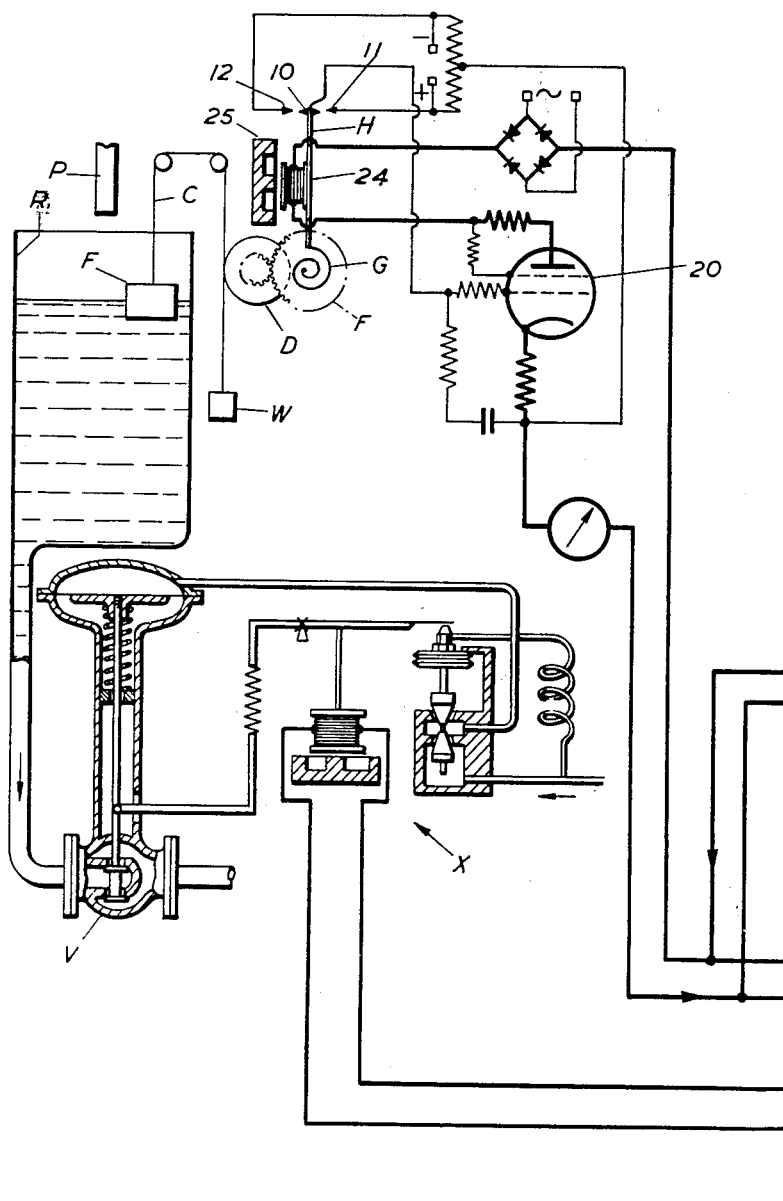

United States Patent Office 2,757,326
Patented July 31, 1956

2,757,326

SERVO ELECTRICAL CONTROLLING APPARATUS

James Reilly Boundy, Chiswick, London, England, assignor to Evershed & Vignoles Limited Application August 10, 1953, Serial No. 373,360

Claims priority, application Great Britain August 13, 1952

7 Claims. (Cl. 318—32)

This invention relates to electrically-actuated apparatus for controlling physical quantities which are subject to variation. In general the invention is concerned with controllers for use in maintaining a system in a state of equilibrium in which a particular quantity is maintained at a datum value. Such a controller is brought into action by departure of the quantity from its datum value and operates to control a valve or other regulating member to restore the state of equilibrium. It is well-known that in order to achieve this effect, an electrical controller must produce an output current which has components proportional respectively to the departure of the physical quantity from its datum value, that is to say, the error of the system, and also to the integral of that error with respect to time. In addition, a third component may also be introduced, if desired, proportional to the derivative of the error. Controllers operating on these general principles are described, for example, in the specifications of United States Patent No. 2,608,678 and application Serial No. 279,157 filed March 28, 1952.

Controllers of this kind are primarily designed to operate when the system under control is in a continuous state of operation. In some cases, however, the operation of the system may be intermittent and in fact it may remain idle for considerable periods. Considering a specific example, such as that, for example described in the specifications already referred to, a controller may be used to control the level of liquid in a tank or reservoir. For this purpose, the output current of the controller may be used either to adjust the rate of outflow from the tank in accordance with changes of the inflow, or vice versa. This control then serves to maintain the liquid level at a predetermined datum value, and as soon as the level departs from this value the controller operates to produce the necessary components in its output current to provide the desired control.

Thus any departure of the liquid level from its datum value results in an integrating circuit in the controller producing a current component proportional to the integral with respect to time of the error. If the controller is controlling the outlet valve, for example, and inflow to the reservoir ceases, the level will start to fall and the integrating circuit will start to integrate the error thus produced so as to tend to close the outlet valve. As the level continues to fall, the closing action of the valve will continue until finally the valve is completely closed, and this may occur either before or after the reservoir is completely empty. When this state of affairs is reached, the error will remain constant and thus the component of the output current of the controller, which is proportional to the error, will also remain constant. The component proportional to the integral, however, will continue to build up with time. In other words, although the valve is completely shut, the output current will continue to increase in an attempt to close the valve still further.

The inflow to the reservoir may be interrupted for any length of time, during which the current will continue to build up in this manner unless a maximum value is reached when components of the circuit become saturated. If the inflow then restarts so that the reservoir starts to fill up again, the outlet valve will not immediately re-open and will, in fact, stay closed until the integral component of the controller output has been reduced to its normal operating value. This cannot occur until an error in the opposite direction has been produced for a time approximating to that when the valve was closed. If the tank has been empty for some while, it is probable that the outlet valve will not open until the tank has overflowed. Up to the present, the only way of avoiding this difficulty has been to switch off the controller if the operation of the system has become discontinuous. This is undesirable, however, since the controller may not be able to resume control immediately it is switched on again.

According to the present invention, when the output current of the controller reaches a value corresponding approximately to one of the limits of the range of operation of the regulating member, that is to say, the valve in the example just given, a control device is brought into action to interrupt or modify the integrating action of the circuit producing the integral component. Thus despite the fact that the operation of the system may be interrupted for a considerable period, the output current of the controller is maintained constant so that as soon as operation is restarted the controller is able to resume control again after a relatively short period.

Although one of the limits of the range of operation of the regulating member is in general more important than the other, the integral control device is preferably brought into action when the output current reaches a value corresponding to either of these limits. Thus in the example the integrating action of the integral circuit is interrupted or modified not only when the fully closed position of the outlet valve is reached, but also when the current corresponds to the fully open position of the valve.

In the forms of controller described in the afore-mentioned patent applications, the integral component of the output current of the controller is produced by a thermionic valve having its control grid maintained at a voltage proportional to the required integral. Thus to interrupt the operation of the integral circuit, the integral control device may be arranged to respond to the variation of the output current in such a way as to produce a variation of the voltage of the control grid in the opposite direction to that corresponding to the variation of the output current. Thus if, for example, the integral component of the output current is increasing, the device serves to control the grid potential so as to reduce the integral component, and as soon as this happens the integral control device is put out of action and the integral component continues to build up again. In this way, the output current is caused to fluctuate on either side of its limiting value.

The invention will now be described in more detail by way of example with reference to the accompanying drawing, which is a circuit diagram of the form of controller shown in U. S. application Serial No. 279,157 filed March 28, 1952, as modified in accordance with the invention. The full operating details of this circuit are described in the aforesaid specification, but for the present purpose the following brief description of the general operation will suffice.

The controller operates to control the liquid level in a reservoir R in accordance with changes in the inflow through a pipe P, which may vary with conditions in a remote part of the system and which thus constitutes the independent variable. In order to achieve this, the output from the controller is applied to an electro-pneumatic power receiver indicated generally at X, which adjusts the setting of an outlet valve V so that the outflow is regulated in accordance with the inflow to maintain the liquid level at its desired value. For this purpose, a float F on the surface of the liquid transmits the liquid level by way of a cord C weighted by means of a weight W to a rotary disc D around which it passes, and thence to a wheel F carrying a spring G. As the liquid level varies so a lever arm H carried by the spring G is rocked either to the right or left so that a contact 10 at its end engages one of a pair of fixed contacts 11 and 12. These control the grid potential of a thermionic valve 20, the anode current of which passes through a coil 24, co-operating with a pot magnet 25 to restore the balance of the arm H. Thus the anode current of the valve 20 is adjusted in accordance with changes in the liquid level.

The anode current of the valve 20 flows in opposition to the anode current of a valve 41 through a coil 37. The anode current of the valve 41 is held constant by means of a device comprising a pair of photo-electric cells 60 and 61 and is adjusted by means of a shunt 67. This shunt is set so that the anode current of the valve 41 represents the desired value of the liquid level in the reservoir R. Thus when the liquid level is at its desired value, the anode current of the valve 20 is equal to that of the valve 41 and no net current flows in the coil 37. Under all other conditions, the current in the coil 37 repents the error in the system.

A second coil 38 is wound on the same former 39 as the coil 37 and has its current adjusted by a device comprising a pair of photo-electric cells 73 and 74, which control the grid of a thermionic valve 80 whose anode current supplies the coil 38 in opposition to a constant current from a rectifier 85. Thus according as the anode current of the valve 80 is greater or less than the current of rectifier 85 so the direction of the current in the coil 38 will vary, being adjusted in magnitude so as at all times to be equal to that in the coil 37. Thus with equal currents in the coils 37 and 38 variation of a tapping 53 on a shunting resistance 54 gives a proportional band setting whereby the current flowing to the coil 38 is given any desired ratio to the current flowing to the coil 37.

The anode current of the valve 80 then flows through a further coil 90, which is wound on a former 92 to turn between permanent magnet pole pieces 93 against the action of a spring 89. The former 92 carries a light arm 94 provided with a shutter 95 co-operating with an apertured screen 96 to control the proportion of light from a lamp 97, energised from a source of alternating current 98, through a variable resistance 105, falling on each of a pair of emission-type vacuum photo-electric cells 99 and 100.

These cells are energised from a source of direct current 101 at a voltage above that corresponding to the saturation current. The cells form two arms of a current bridge of which the other arms are constituted by equal resistances 102 and 103. By reason of the fact that the two cells are operating under saturation conditions, the current which they can carry depends solely on their degree of illumination and does not vary with the applied voltage. Thus any degree of out-of-balance in the illumination of the two cells is under normal operating conditions, represented by a current output from the bridge which is directly proportional to the difference in the illumination of the two cells. This in its turn is proportional to the displacement of the shutter 95 and thus to the current flowing in the coil 90.

The current output from the current bridge is applied to charge a relatively large storage condenser 104, the voltage of which at any time thereby represents the integral with respect to time of the current flowing in the coil 90 and hence of the error in the system. One plate of the condenser is connected to the grid of a thermionic valve 110, while the other plate is connected by way of a resistance 111 to the cathode of this valve. In this way, the anode current of the valve 110 is controlled so as to be proportional to the required integral. The coil 90 is provided with a variable shunt 109 which enables the factor of proportionality to be varied as necessary, and which may be adjusted as an alternative to varying the resistance 105.

The anode current of the valve 80, after flowing through the coil 90, then flows through a resistance 112 constituting part of a differentiating network which also includes a condenser 113 and the resistance 111, connected in series between a tapping point 114 on the resistance 112 and the right-hand end of the resistance 112. A voltage proportional to the anode current of the valve 80 is available between these points (point 114 and the right end of resistance 112), and when this current varies a voltage proportional to the rate of change of the current is available across the resistance 111 so that a current proportional to the rate of change of the anode current flows into or out of the condenser 104.

The valve 110 has its anode current supplied by a full-wave rectifier 106 from a source of alternating current 107. A neon tube 108 connected between the screen grid of the valve and the negative pole of the rectifier 106 serves to stabilise the supply voltage. Thus a voltage proportional to the derivative of the anode current of the valve 80 appears across the resistance 111, and is added to that across the condenser 104 so that the anode current of the valve 110 in addition to the integral component, also includes a derivative component. This derivative component may be varied by adjustment of the tapping 114 and since under conditions of equilibrium there is no current flowing through the resistance 112, thus adjustment can be carried out without shock to the systems. The anode current of the valve 110 flows in conjunction with the anode current of the valve 80 to the power receiver X.

The total output to the power receiver, therefore, consists of a current proportional to the error in the system, i. e. the current in the coil 90, plus the anode current of the valve 110 which comprises both integral and derivative components. The power receiver X then operates to adjust pneumatic pressure to control the opening of the outlet valve V accordingly. Thus at any time the opening of the valve V is proportional to the output current of the controller. If now, for example, the inflow to the reservoir ceases, the level will start to drop and a negative error will be established. At the same time, the output current of the controller will drop and the valve V will start to close. Since, however, no further liquid is flowing into the reservoir, the level will continue to drop and the rate of closing of the valve V will increase until it is finally completely shut. This may happen either before or after the reservoir is completely empty, dependent on the rate of response of the controller itself and the power receiver. Once, however, the valve is completely shut, conditions in the reservoir will remain static, but, of course, there will be a permanent error present and the integral with respect to time of this error will, in the basic form of controller described in application Serial No. 279,157 filed March 28, 1952 continue to vary at a steady rate. Thus the output of the controller will continue to drop in an attempt to close the valve V still further. When inflow to the reservoir is resumed, however, the error will rapidly be cancelled out and an error in the opposite direction will be established. This will tend to vary the integral in the opposite direction to that in which it has been varying while the inflow has been interrupted, but if the interruption has been for a considerable time, a long interval will elapse before the output current is restored to a value sufficient to start re-opening the valve V and in the meantime the reservoir may have over-flowed.

In accordance with the present invention, therefore, the continued increase in the integral component is prevented by an integral control device which modifies or interrupts the integrating action of the integrating circuit. Such a device comprises a moving coil 200 working in the gap between a pair of permanent magnet pole pieces 201 is connected to receive the output current from the controller. The torque on the coil is resisted by a coiled spring 202 so that the deflection of the coil at any time is proportional to the output current of the controller. The coil bears a contact-making arm 203 playing between a pair of fixed contacts 204 and 205. The contact 204 is connected by way of a resistance 206 to the cathode of the photo-electric cell 99, while the contact 205 is connected through a similar resistance 207 to the anode of the photo-electric cell 100. The contact-making arm 203 is connected to the mid-point between the photo-electric cells 99 and 100. Thus when the output current of the controller decreases to a value corresponding to the completely closed position of the valve V, the spring 202 takes charge and moves the arm 203 into engagement with the fixed contact 205 and this effectively connects the resistance 207 in parallel with the photo-electric cell 100, thereby reducing the impedance of this arm of the bridge. The value of the resistance 207 is so selected that although under these conditions the cell 99 is the more brightly illuminated, the impedance of the arm containing the cell 100 is reduced below that of the opposite arm, thereby causing a charging current to flow into the condenser 104, increasing the voltage of the grid of the valve 110 and correspondingly increasing its anode current. As soon as this happens, the output current of the controller is correspondingly increased and the moving coil 200 is deflected to move the arm 203 away from the contact 205.

As soon as this happens, the photo-electric cell 100 is again unshunted, the output current of the bridge flows in the opposite direction and the condenser 104 discharges until the arm 203 once again engages the fixed contact 205 and the process is repeated. In this way, the output current of the controller is caused to fluctuate by a very small amount on either side of its value corresponding to the completely closed position on the valve V.

Similarly when the output current of the controller reaches a value corresponding to the fully open position of the valve V, the arm 203 engages the fixed contact 204, thus connecting the resistance 206 in parallel with the photo-electric cell 99. The resistance 206 is equal to the resistance 207 and thus has the effect of reducing the impedance of the arm containing the cell 99 to a value below that of the opposite arm containing the cell 100 which is the more brightly lit. This causes the condenser 104 to discharge and produces a corresponding reduction in the output current of the controller. Once again this output current is again caused to fluctuate on either side of its limiting value.

Thus it will be understood that although the interruption to the normal operation of the system may be maintained for a considerable period of time, the output current of the controller is maintained at a value such that it is ready to restart operation practically immediately the operation of the system as a whole is resumed.

I claim:

1. In an electrically-operated controller in which the magnitude of a physical condition is subject to variation from a datum value and in which the magnitude of the same physical condition may be varied by control means having a movable member, the combination of means for producing a first electric current whose magnitude varies with the magnitude of the departure of said condition from said datum value, integrating means for establishing a current component proportional to the integral with respect to time of said current, a current-operated control device connected to operate said movable member and being energized by a control current comprising the sum of said first current and said integral current component, and integral-component control means controlled by said control current and being operative upon said control current reaching a predetermined value to vary the operation of said integrating means to maintain the integral current component at a substantially constant value.

2. An electrically-operated controller according to claim 1 wherein said movable member operates through a limited range of movement, and said integral-component control means responds to said control current when it reaches a value corresponding substantially to one of the limits of movement of said movable member to maintain said integral current component substantially constant.

3. An electrically-operated controller according to claim 2, wherein said integral-component control means is rendered operative when said control current reaches a value corresponding to either of the limits of the range of operation of said movable member.

4. An electrically-operated controller according to claim 1 in which said integrating means includes an electron tube relay having a control grid maintained at a voltage proportional to said integral component, and said integral-component control means responds to changes in said control current to vary the voltage applied to said control grid in the opposite direction to that corresponding to the variation of said control current, thereby causing said control current to fluctuate on either side of its limiting value.

5. An electrically-operated controller according to claim 4 in which said integrating means further includes a condenser connected between the grid and the cathode of said electron tube relay, a current bridge controlled by the current the effect of which is to be integrated, connections for charging said condenser from the unbalance current of said bridge, and wherein said integral-component control means comprises means for modifying the balance of said bridge to produce a corresponding change in the voltage applied to said grid.

6. An electrically-operated controller according to claim 5, in which the current bridge comprises a pair of vacuum type emission photo-electric cells connected in series across a source of direct current potential sufficient to produce the saturation current in the cells, the other two arms of the bridge being formed by resistances, a light shutter controlling the differential illumination of the two cells, and means for operating said shutter comprising a moving coil working in a permanent magnet field and carrying a current proportional to the current the effect of which is to be integrated.

7. An electrically-operated controller according to claim 6, in which the integral-component control means includes a moving coil working in a magnetic field and energized by a current proportional to said control current to produce a corresponding angular deflection, and a moving contact carried by said coil and movable into engagement with one of a pair of fixed contacts when the control current reaches either of its limits so as to complete one of a pair circuits to shunt the appropriate photo-electric cell.

References Cited in the file of this patent
UNITED STATES PATENTS

| | | |
|---|---|---|
| 2,608,678 | Marchment et al. | Aug. 26, 1952 |
| 2,666,170 | Davis | Jan. 12, 1954 |
| 2,668,264 | Williams | Feb. 2, 1954 |